United States Patent [19]
Kaite et al.

[11] Patent Number: 5,140,408
[45] Date of Patent: Aug. 18, 1992

[54] COLOR COMPONENT SIGNAL CONVERTING APPARATUS HAVING AN INPUT DEPENDENT SWITCHABLE MATRIX

[75] Inventors: Osamu Kaite, Osaka; Takahiro Yuchi, Hyogo; Hirotsugu Murashima, Nara, all of Japan

[73] Assignee: Sanyo Electric Co., Ltd., Osaka, Japan

[21] Appl. No.: 476,858

[22] Filed: Feb. 8, 1990

[30] Foreign Application Priority Data

Feb. 10, 1989 [JP] Japan .................................. 1-32005

[51] Int. Cl.⁵ ...................... H04N 9/64; H04N 9/67; H04N 9/76
[52] U.S. Cl. ...................................... 358/21 R; 358/30
[58] Field of Search ................ 358/21 R, 30, 13 C

[56] References Cited

U.S. PATENT DOCUMENTS

| | | | |
|---|---|---|---|
| 4,464,685 | 4/1984 | Wilkinson | 358/13 C |
| 4,660,073 | 4/1987 | Baumeister | 358/21 R |
| 4,743,960 | 5/1988 | Duvic et al. | 358/13 C |
| 4,772,938 | 9/1988 | Sasson | 358/13 C |

OTHER PUBLICATIONS

"Video Signal Processing for ½" Cassette Hi-Vision VTR", T. Bannai et al, Technical Report of the Institute of Television Engineers of Japan, Oct., 1989, vol. 13, No. 50, pp. 7–12.

Primary Examiner—David K. Moore
Assistant Examiner—Wendy R. Greening
Attorney, Agent, or Firm—Armstrong, Nikaido, Marmelstein, Kubovcik & Murray

[57] ABSTRACT

Supplied selectively to a recording system circuit of a VTR are a first component signal comprising three primary color signals R, G and B and a second component signal comprising a luminance signal Y and two types of color difference signals $P_B$ and $P_R$. The first and the second component signals pass through a group of LPFs (1, 2, 3) having the same pass characteristics and then are A/D converted at the same sampling clock. The component signal converted into a digital signal is applied to a matrix circuit 11. Respective coefficients of the matrix circuit are switched according to a type of the inputted component signal, and as a result, a second digital component signal is always outputted at a fixed delay time from the matrix circuit. Two color signal data which are over-sampled included in the second digital component signal are applied to decimation digital filters 14 and 15 to reduce data densities thereof.

10 Claims, 5 Drawing Sheets

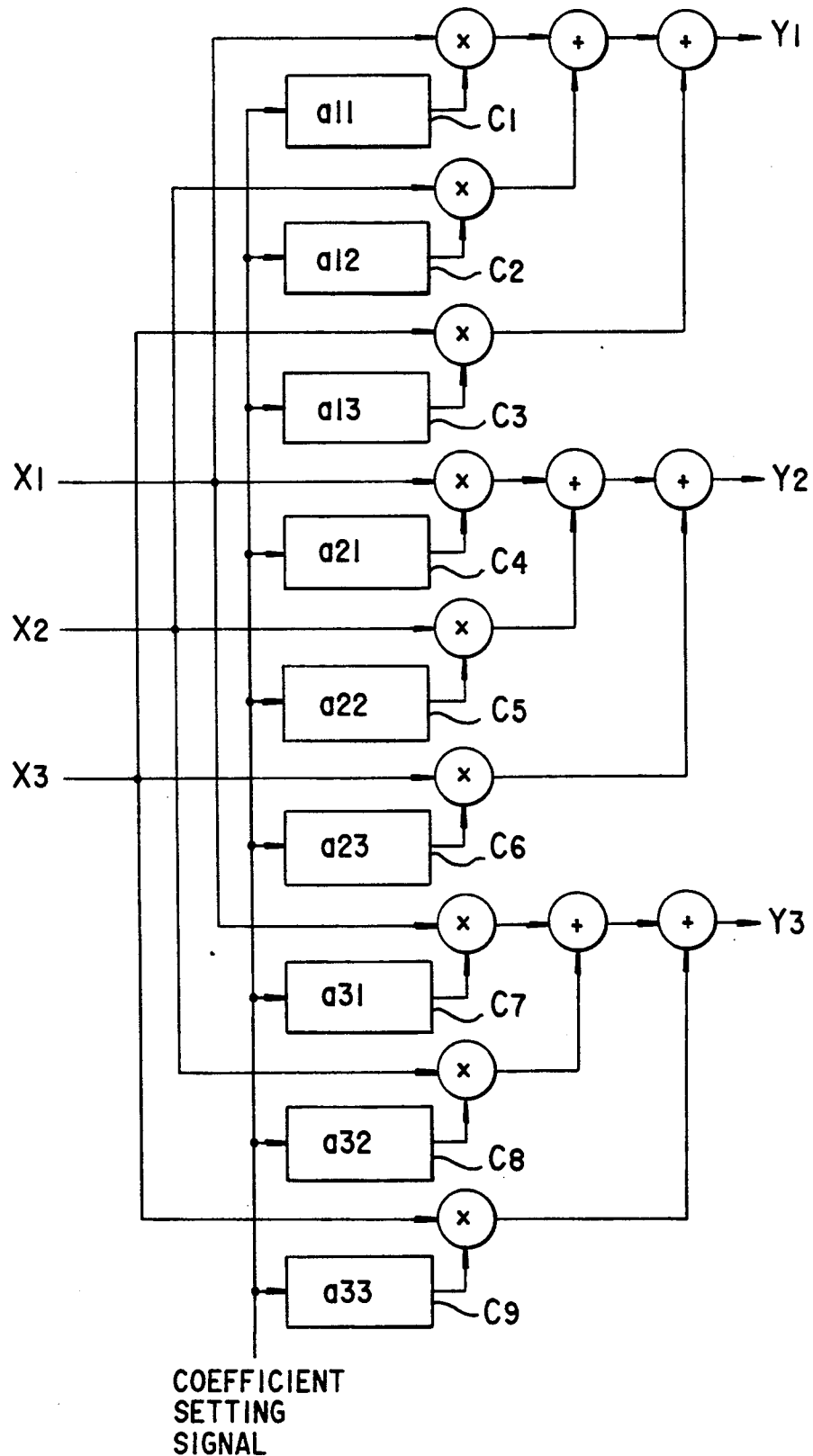

ent signal comprising three primary color signals of R, G and B and a second component signal comprising a luminance signal and two types of color difference signals are inputted and outputted selectively. Such a conventional VTR is disclosed in, for example, "Video Signal processing for ¼" Cassette Hi-Vision VTR" by T. Bannai et. al on pp. 7-12, No. 50, Vol. 13 in "Technical Report of The Institute of Television Engineers of Japan" October, 1989.

FIG. 1 is a block diagram showing a conventional recording and reproducing circuit of a VTR for a high definition television signal (referred to as HDTV signal hereinafter) capable of selectively receiving and outputting two types of color component signals as described above. In the prior art of FIG. 1, it is assumed that a first component signal comprising three primary color signals of R, G and B and a second component signal comprising a luminance signal Y and two types of color difference signals $P_B$ and $P_R$ are used as two types of color component signals. The color difference signals $P_B$ and $P_R$ are signals having relations $P_B=(B-Y)/1.826$ and $P_R=(R-Y)/1.576$ with respect to color difference signals B−Y and R−Y respectively. FIGS. 2(a), (b) and (c) are timing charts showing signal waves of the G, B and R constituting the first component signal, and (d), (e) and (f) are timing charts showing signal waves of the Y, $P_B$ and $P_R$ constituting the second component signal.

On the other hand, in the prior art of FIG. 1, a video signal to be recorded on a video tape (referred to as recording video signal hereinafter) comprises two channels, each channel being a TCI signal obtained by time-divisional compressing by a predetermined compression ratio and multiplexing line sequentially provided color difference signals $P_B$ and $P_R$ and the Y signal. FIGS. 2 (G) and (H) are timing charts showing signal waves of the first and the second channel recording video signals TCI-A and TCI-B respectively.

First, the above described first component signal or second component signal is supplied, depending on circumstances, to color component signal input terminals 71, 72 and 73 of the VTR of FIG. 1. As a supply source of the first component signal, that is, a signal source for outputting the three primary color signals of R, G and B, there is a video output of a video camera, a video output of computer graphics, picture output of hard copy or the like, and as a supply source of the second component signal, there is an output of a conventional transmission system of a video signal such as a VTR output, a video disc player output and a tuner output.

Since each of the three primary color signals R, G and B constituting the first component signal has a band as wide as 20 MHz, it is disadvantageous to record the signals as they are on a video tape. On the contrary, the second component signal is more advantageous than the first component signal in recording because each band of the color difference signals $P_B$ and $P_R$ is 7 MHz although the Y signal has a band of 20 MHz. Therefore, while when the second component signal is supplied to the input terminals 71, 72 and 73 it is subjected to a digital processing and converted into the above described TCI recording video signals, when the first component signal is supplied to the input terminals 71, 72 and 73, it should be once converted into the second component signal, subjected to a digital processing and then converted into TCI recording video signals.

In the VTR of FIG. 1, selection of the first or the second component signal is instructed by a user, and in response thereto, an input format switching signal is applied to an input terminal 74 from a signal source (not shown). The above described input terminals 71, 72 and 73 are connected to respective common contacts of a first group of switches 51, 52 and 53 each controlled by the input format switching signal. When the first component signal is inputted to the input terminals 71, 72 and 73, the first group of switches 51, 52 and 53 are switched in response to the input format switching signal such that the inputted signals R, G and B constituting the first component signal are inputted to a matrix circuit 50. The matrix circuit 50 converts the signals R, G and B into the second component signal through the analog processing and applies the converted signal to respective one contacts of a second group of switches 54, 55 and 56. As the foregoing, when the first component signal is selected, these switches 54, 55 and 56 are switched so as to select outputs of the matrix circuit 50 in response to the input format switching signal. Accordingly, the Y, $P_B$ and $P_R$ of the second component signal outputted from the matrix circuit 50 are applied to first, second and third low pass filters (LPF) 1, 2 and 3 through the first group of switches 54, 55 and 56, respectively.

When the second component signal is inputted to the input terminals 71, 72 and 73, the first group of the switches 51, 52 and 53 and the second group of switches 54, 55 and 56 are switched in response to the input format switching signal such that the inputted signals Y, $P_B$ and $P_R$ constituting the second component signal are inputted to the first, the second and the third LPFs 1, 2 and 3 through delay circuits 76, 77 and 78, respectively.

A cut-off frequency of the first LPF 1 is set at 20 MHz in order to select the Y signal component and each cut-off frequency of the second and the third LPFs 2 and 3 is set at 7 MHz in order to select color difference signal components. An output of the fist LPF 1 is applied to a first clamp circuit 4 through a delay circuit 79 and outputs of the second and the third LPFs 2 and 3 are applied as they are to second and third clamp circuits 5 and 6. The first clamp circuit 4 clamps a black level of the Y signal and the second and the third clamp circuits 5 and 6 clamp achromatic color portions of the color difference signals to suppress the fluctuation of direct current levels.

Outputs of the clamp circuits 4, 5 and 6 are applied to first, second and third A/D converting circuits 8, 9 and 10, respectively. The first A/D converting circuit 8, and the second and the third A/D converting circuits 9 and 10 perform A/D conversion at sampling frequencies of 48.6 MHz and 16.2 MHz respectively. These sampling frequencies are set to equal to the sampling rates (Y signal: 48.6 MHz, $P_B$ and $P_R$ signals 16.2 MHz) defined by a format for a VTR so as to define a band of a recording signal. The respective signals Y, $P_B$ and $P_R$ converted into the digital signals by the A/D converting circuits are applied to a recording system video signal processing circuit 16, and wherein the converted signals are subjected to a digital processing of the above described time divisional compression and multiplexing (TCI processing) to become two channel recording video signals as shown in FIGS. 2 (g) and (h). As shown in FIGS. 2 (g) and (h), a signal of each channel of the TCI recording video signals comprises a horizontal synchronizing signal, a burst signal, a line sequential color difference signal and a luminance signal which are time divisional multiplexed by a predetermined ratio and disposed on the basis of two horizontal synchronizing periods (2H) as one unit. A timing signal necessary for such a TCI signal processing is supplied to the video signal processing circuit 16 from a recording timing signal generating circuit 17, in synchronization with a synchronizing signal of the component signal inputted to a synchronizing signal input terminal 75.

The two channel recording video signals outputted from the video signal processing signal 16 are converted into analog signals at a clock frequency of 32.4 MHz by first and second D/A converting circuits 18 and 19 and then FM modulated by first and second FM modulation circuits 20 and 21. Outputs of the FM modulation circuit 20 and 21 are supplied to rotary magnetic heads 22 and 23 respectively and then recorded on a magnetic tape 24.

Then, in the time of reproduction of the recording video signal, it is necessary for the VTR of FIG. 1 to supply the video signal reproduced from the magnetic tape as either of the first or the second component signals in response to the request. More specifically, in the VTR of FIG. 1, in reproducing the signal, the two channel video signals reproduced from the magnetic tape 24 by the rotary magnetic heads 22 and 23 are FM demodulated by first and second FM demodulation circuits 27 and 28, and which signals are applied to fourth and fifth A/D converting circuits 30 and 31 respectively, and then A/D converted at the sampling frequency of 32.4 MHz. The reproduced video signals converted into the digital signals by the A/D converting circuits 30 and 31 respectively are applied to a reproducing system video signal processing circuit 33. The video signal processing circuit 33 digitally restores the applied TCI video signals to the Y signal and the two color difference signals $P_B$ and $P_R$ in a reverse manner to that by the above described recording system video signal processing circuit 16. The outputs of the FM demodulation circuits 27 and 28 are also applied to a synchronization separating circuit 29 wherein they are subjected to a synchronization separation. Then, a reproducing timing signal generating circuit 32 generates a timing signal for data writing and supplies the same to the video signal processing circuit 33, based on an output of the synchronization separating circuit 29. On the other hand, the reproducing timing signal generating circuit 32 generates a timing signal for data writing and supplies the same to the video signal processing circuit 33, in synchronization with an external synchronizing signal inputted to the synchronizing signal input terminal 75. Furthermore, a synchronizing signal generating circuit 39, based on the timing signal for data writing, generates a synchronizing signal having a phase coincident with that of the outputted component signal and outputs the same through a synchronizing signal output terminal 80.

The signals Y, $P_B$ and $P_R$ restored by the video signal processing circuit 33, after being converted into analog signals by third, fourth and fifth D/A converting circuits 40, 41 and 42 respectively, are applied to first, second and third blanking circuits 43, 44 and 45. The third D/A converting circuit 40 performs a D/A conversion at a clock frequency of 48.6 MHz and the fourth and the fifth D/A converting circuits 41 and 42 perform D/A conversions at a clock frequency of 16.2 MHz.

Then, processings such as addition of synchronizing signals and the like are performed in the first, the second and the third blanking circuit 43, 44 and 45, and thereafter the first blanking circuit 43 defines a blanking level of the Y signal as a black level, and the second and the third blanking circuits 40 and 45 define blanking levels of the color difference signals $P_B$ and $P_R$ as achromatic color level. Outputs of the blanking circuits 43, 44 and 45 are applied to fourth, fifth and sixth LPFs 47, 48 and 49 respectively. The fourth LPF 47 has a cut-off frequency of 20 MHz for extracting a Y signal, and each of the fifth and the sixth LPFs 48 and 49 has a cut-off frequency of 7 MHz for extracting a color difference signal.

An output of the LPF 47 is applied to an inverse matrix circuit 60 through a delay circuit 85 and further applied to a delay circuit 86. Outputs of the LPFs 48 and 49 are applied to the inverse matrix circuit 60 and thereafter applied to delay circuits 87 and 88 respectively. Outputs of the delay circuits 86, 87 and 88 are applied to respective ones of contacts of a third group of switches 57, 58 and 59 respectively. Outputs of the inverse matrix circuit 60 are applied to the others of contacts of the third group of switches 57, 58 and 59. The inverse matrix circuit 60 converts the Y signal and the two color difference signals $P_B$ and $P_R$ outputted respectively from the LPFs 47, 48 and 49 into the first component signal comprising of three primary color signals R, G and B.

In the VTR of FIG. 1, it is selected by a user whether a reproduced video signal is outputted in the form of the first or second component signal, and in response thereto an output format switching signal is supplied from a signal source (not shown) to the third group of switches 57, 58 and 59 through a terminal 84. More specifically, in case the signal is outputted in the form of the second component signal, the switches 57, 58 and 59 are switched such that they select the outputs of the delay circuits 86, 87 and 88 and output the same through terminals 81, 82 and 83. On the other hand, in case the signal is outputted in the form of the first component signal, the switches 57, 58 and 59 are switched such that they select the first component signal outputted from the inverse matrix circuit 60 and output the same through the terminals 81, 82 and 83.

Now descriptions will be given of reasons why delay circuits 76, 77, 78 and 79 are provided in a circuit structure of a recording system and delay circuits 85, 86, 87 and 88 are provided in a circuit structure of a reproducing system in the VTR of FIG. 1.

Namely, several ten nanoseconds are usually required for a matrix processing for converting a first component signal into a second component signal in the matrix circuit 50 of FIG. 1. Therefore, if the delay circuits 76, 77 and 78 are not provided, when the first component signal is selected, a delay of several ten nanoseconds with respect to the input synchronizing signal occurs in later processings as compared with a case in which the second component signal is selected as a video input signal. Accordingly, in order to eliminate such a time difference between the case in which the first component signal is selected and the case in which the second component signal is selected, the delay circuits 76, 77 and 78 each having a delay time corresponding to the above described delay time are provided in signal paths of the signals Y, $P_B$ and $P_R$ constituting the second component signal respectively.

Also in the inverse matrix circuit 60 of FIG. 1, several ten nanoseconds are required for an inverse matrix processing for converting a second component signal into a first component signal. Accordingly, in order to eliminate such a time difference, the delay circuits 86, 87 and 88 each having a delay time corresponding to the above described delay time are provided in signal paths of the signal Y, $P_B$ and $P_R$ constituting the second component signal respectively.

On the other hand, in the recording system circuit of the VTR of FIG. 1, the first LPF 1 differ from the second and the third LPFs 2 and 3 not only in band pass characteristics (the former has a cut-off frequency of 20 MHz and the later 7 MHz) as described above but also in delay characteristics. Accordingly, since the Y signal outputted from the first LPF 1 and the color difference signals $P_B$ and $P_R$ outputted from the second and the third LPFs 2 and 3 have a time difference, the delay circuit 79 is interposed in the path of the Y signal in order to compensate for such a time difference. Similarly, also in the reproducing system circuit, since the fourth LPF 47 differs from the fifth and the sixth LPFs 48 and 49 in delay characteristics, the delay circuit 85 is interposed in the path of the Y signal in order to compensate for a time difference between the Y signal outputted from the fourth LPF 47 and the color difference signals $P_B$ and $P_R$ outputted from the fifth and sixth LPFs 48 and 49.

However, in the conventional VTR shown in FIG. 1, switching of matrix processing/inverse matrix processing between the first and the second component signals requires a large number of switching circuits and delay circuits, which results in a remarkably complicated circuit structure.

In addition, an entire circuit is large-sized, largely due to the delay circuits 79 and 85 provided in the Y signal paths. Regarding these delay circuits 79 and 85, although it is possible to attain the same delay effect through an adjustment of a writing/reading timing of the video signal processing circuits 16 and 33, it is very inconvenient to adjust a writing/reading timing only for the Y signal included in the three channel second component signal since such method makes the structure of the timing generating circuit remarkably complicated resulting in the increased cost.

SUMMARY OF THE INVENTION

Therefore, an object of the present invention is to eliminate a signal delay resulting from matrix processing/inverse matrix processing between first and second color component signals with a simple structure.

Another object of the present invention is to eliminate a signal delay between channels of a second component signal due to a difference of pass characteristics of low pass filters with a simple circuit structure.

Briefly stated, the present invention is a color component signal converting apparatus for receiving a first analog color component signal comprising three primary color signals or a second analog color component signal comprising a luminance signal and two types of color signals to convert the same into a second digital color component signal, and which comprises a signal source for selectively supplying first or second analog color component signal, a group of low pass filters having common pass characteristics and for receiving the respective signals constituting the supplied first or second analog color component signal, a group of A/D converting circuits for A/D converting respective outputs of the group of low pass filters at the same phase and the same frequency, a matrix circuit having matrix coefficients switchable according to a type of the selected color component signal and for receiving outputs of the group of A/D converting circuits to convert the same into digital luminance signal data and two types of digital color signal data constituting a second digital color component signal, and first and second digital filters each for decimating data density by limiting at least high frequency components of the color signal data.

According to another aspect of the present invention, a color component signal converting apparatus for receiving a second color component signal comprising digital luminance signal data and two types of digital color signal data to selectively convert the same into a first analog color component signal comprising three primary color signals or a second analog color component signal comprising a luminance signal and two types of color signals comprises first and second digital filters each for interpolating data density of the color signal data by limiting at least high frequency components of the color signal data, an inverse matrix circuit having matrix coefficients which can be selected according to a type of the selected color component signal and for receiving luminance signal data and first and second digital filter outputs to convert the same into a first digital color component signal or a second digital color component signal, a group of D/A converting circuits for D/A converting respective outputs of the inverse matrix circuit at the same phase and frequency, and a group of low pass filters having common pass characteristics and for receiving outputs of the group of D/A converting circuits.

Accordingly, a principal advantage of the present invention is that a signal delay between channels of each component signal can be eliminated by passing inputted/outputted color component signals through a group of low pass filters having common pass characteristics.

Another advantage of the present invention is that it will be unnecessary to compensate for a signal delay according to a type of a component signal by always passing the color component signal through matrix/inverse matrix circuits having a fixed delay time, irrespective of a type of the color component signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a circuit diagram showing a matrix circuit shown in FIG. 3.

DESCRIPTION OF THE PREFERRED EMBODIMENTS

Figure 1:
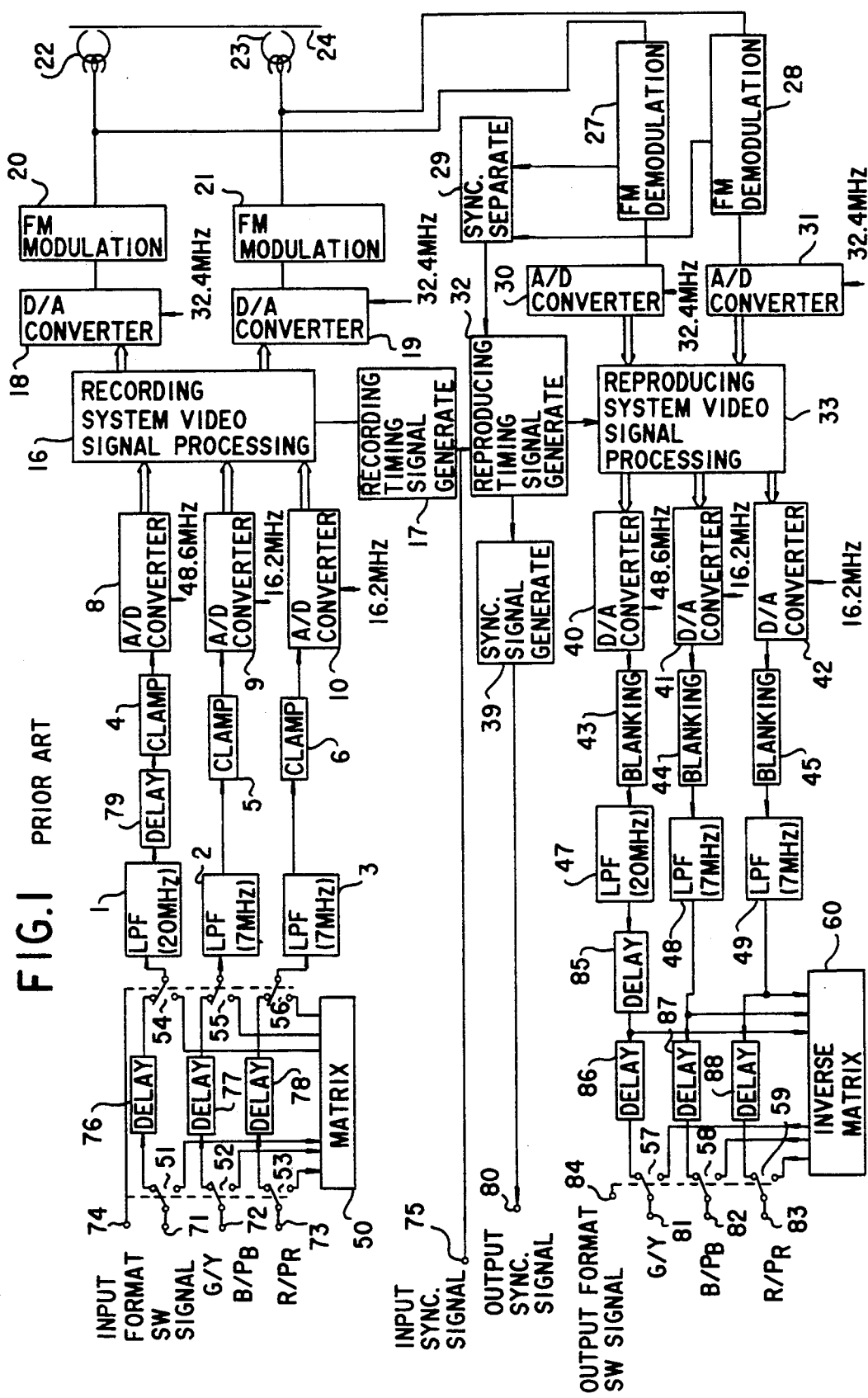
FIG. 1 is a block diagram showing a recording and reproducing circuit for a conventional VTR.
Figure 2:
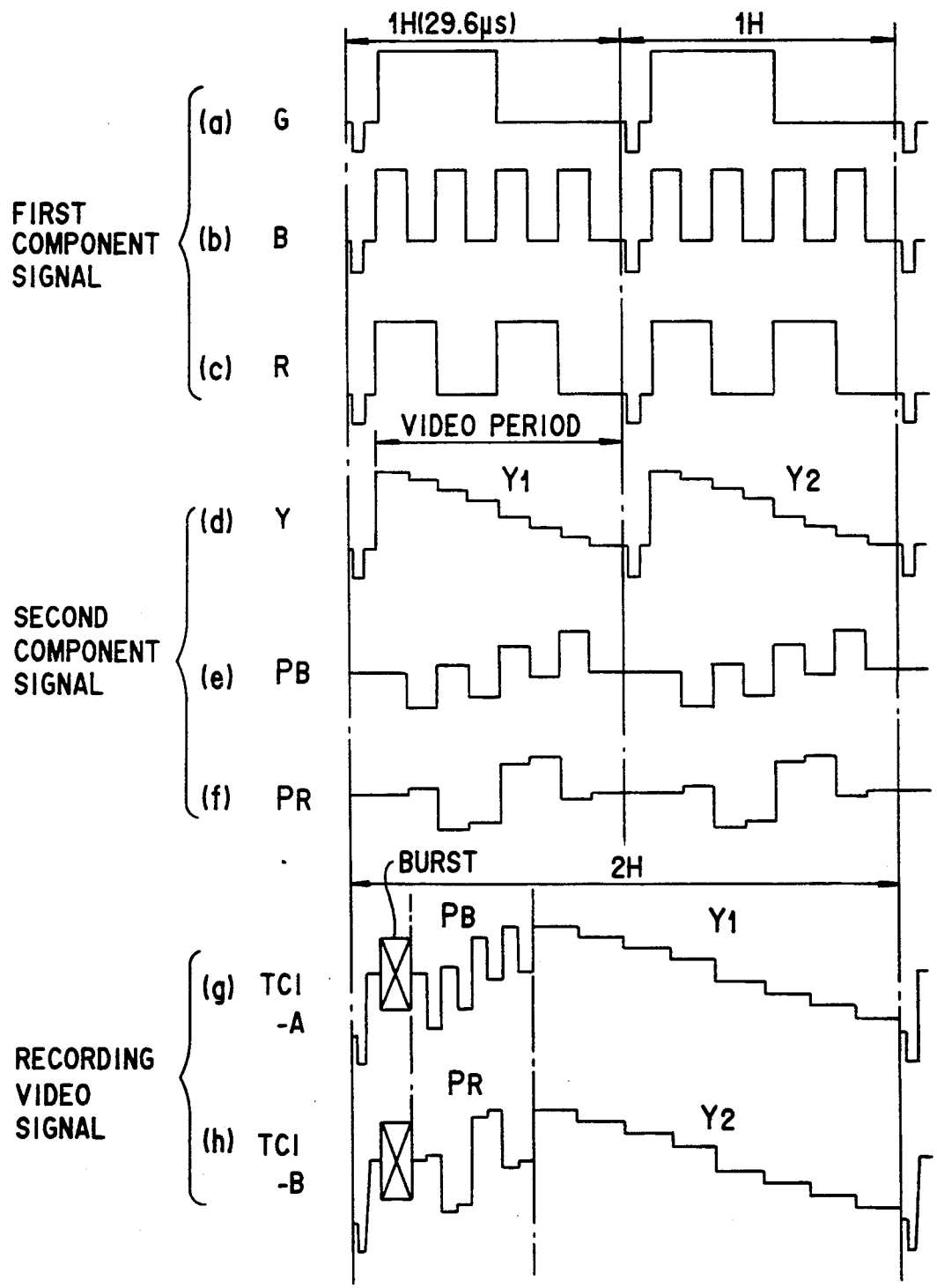
FIG. 2 is a waveform diagram showing various types of color component signals and recording video signals.
Figure 3:
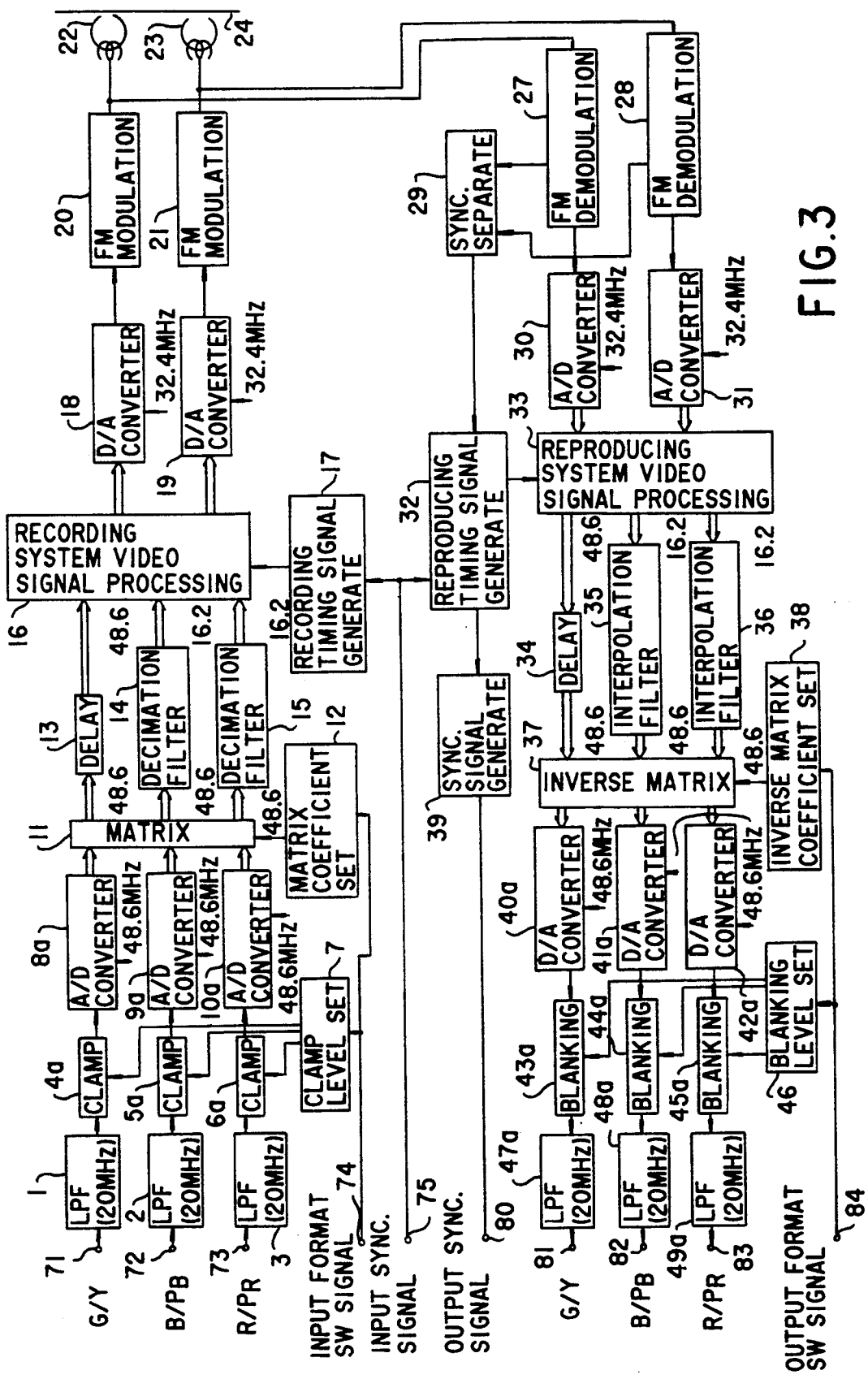
FIG. 3 is a schematic block diagram showing a recording and reproducing circuit for a VTR according to a first embodiment of the present invention.

FIG. 3 is a schematic block diagram showing a VTR for HDTV according to a first embodiment of the present invention and which is structured such that first and second color component signals can be inputted/outputted selectively as the prior art of FIG. 1.

First, a first component signal or a second component signal is supplied from a signal source (not shown) to signal input terminals 71, 72 and 73 of the VTR shown in FIG. 3 depending on circumstances as the prior art of FIG. 1. Selection between the first and the second component signal is made by a user and in response thereto an input format switching signal is applied from the signal source (not shown) to an input terminal 74. The first component signal, that is, three primary color signals R, G, and B or a second component signal, that is, a Y signal and two color difference signals $P_B$ and $P_R$ which are supplied to the input terminals 71, 72 and 73 are respectively applied to LPFs 1, 2 and 3 having the same cut-off frequency of 20 MHz. Accordingly, unlike the prior art of FIG. 1, no delay, that is, no time difference occurs between output signals of respective LPFs. On the other hand, however, the two color difference signals $P_B$ and $P_R$ of the second component signal originally having a band of 7 MHz pass through the LPFs 2 and 3 respectively with unnecessary high frequency components included.

Outputs of the LPFs 1, 2 and 3 are applied to first, second and third clamp circuits 4a, 5a and 6a respectively. These clamp circuits, unlike the clamp circuits 4, 5 and 6 of FIG. 1, are circuits in which clamp voltages can be changed according to a type of an inputted component signal. Namely, a clamp level setting circuit 7 controls each of the clamp circuits 4a, 5a and 6a to switch a clamp voltage in response to the input format switching signal applied from the terminal 74. More specifically, in case of the first component signal, all of the three primary color signals R, G and B are clamped to black levels and in case of the second component signal, the Y signal is clamped to a black level and the two color difference signals $P_B$ and $P_R$ to achromatic color levels.

Outputs of the clamp circuits 4a, 5a and 6a are applied to first, second and third A/D converting circuits 8a, 9a and 10a respectively. Each of these A/D converting circuits 8a, 9a and 10a performs A/D conversion in response to a clock having the same phase and frequency, that is, a sampling clock of 48.6 MHz. Namely, the color difference signals $P_B$ and $P_R$ each having a sampling rate in a transmission path of 16.2 MHz are over-sampled. The first or the second component signal converted into a digital signal by these A/D converting circuits is applied to a matrix circuit 11.

FIG. 4 is a block diagram showing in detail the matrix circuit 11 wherein signals $x_1$, $x_2$ and $x_3$ constituting an inputted component signal are converted into signals $y_1$, $y_2$ and $y_3$ by nine coefficient setting circuits $C_1$–$C_9$.

That is, the circuit of FIG. 4 is structured such that a relation of $$\begin{vmatrix} y_1 \\ y_2 \\ y_3 \end{vmatrix} = \begin{vmatrix} a_{11} & a_{12} & a_{13} \\ a_{21} & a_{22} & a_{23} \\ a_{31} & a_{32} & a_{33} \end{vmatrix} \begin{vmatrix} x_1 \\ x_2 \\ x_3 \end{vmatrix}$$

is generally obtained between the inputs ($x_1$, $x_2$, $x_3$) and the outputs ($y_1$, $y_2$, $y_3$). Respective coefficients of the coefficient setting circuits $C_1$–$C_9$ are variable and more specifically, coefficients $a_{11}$–$a_{33}$ of the respective coefficient setting circuits are set such that in case of the first component signal, a relation of $$\begin{vmatrix} Y \\ P_B \\ P_R \end{vmatrix} = \begin{vmatrix} 0.70 & 0.09 & 0.21 \\ -0.38 & 0.5 & -0.12 \\ -0.44 & -0.06 & 0.5 \end{vmatrix} \begin{vmatrix} G \\ B \\ R \end{vmatrix}$$

is obtained and in case of the second component signal, a relation of $$\begin{vmatrix} Y \\ P_B \\ P_R \end{vmatrix} = \begin{vmatrix} 1 & 0 & 0 \\ 0 & 1 & 0 \\ 0 & 0 & 1 \end{vmatrix} \begin{vmatrix} Y \\ P_B \\ P_R \end{vmatrix}$$

is obtained.

Such a switching of coefficients is performed by a coefficient setting signal generated from a matrix coefficient setting circuit 12 in response to the input format switching signal supplied from the terminal 74.

Accordingly, in the matrix processing by the matrix circuit 11 the same time period is required for both of the first and the second component signals and therefore no delay or no time difference occurs between output signals, depending on a type of the component signal.

As is clear from the above described equations, the matrix circuit 11, when a first component signal is inputted, converts the same into a second component signal and outputs the converted signal, and when a second component signal is inputted, the circuit 11 outputs the signal without conversion. More specifically, while the matrix circuit 11 always outputs a second component signal, the two color difference signals $P_B$ and $P_R$ are over sampled at a clock frequency of 48.6 MHz by the A/D converting circuits 9a and 10a, so that a data density thereof is three times the original data density.

Therefore, the two color difference signals $P_B$ and $P_R$ outputted from the matrix circuit 11 are applied to first and second decimation filters 14 and 15 each formed of a digital LPF of 7 MHz and wherein high frequency components of the signals are cut and data density thereof is decimated to ⅓. A delay circuit 13 for delaying a Y signal output of the matrix circuit 11 is provided having a delay time period equal to a processing time period of the first and second decimation filters 14 and 15. A time difference between respective signals constituting the second component signal is compensated for by the delay of the delay circuit 13.

Then, respective outputs of the delay circuit 13 and the decimation filters 14 and 15 are applied to a recording system video signal processing circuit 16 wherein it is subjected to a digital TCI signal processing as the prior art of FIG. 1. Two channel recording video signals outputted from the recording system video signal processing circuit 16 are recorded on a magnetic tape 24. A circuit structure for this recording is the same as that of the prior art of FIG. 1 and therefore no description will be made here.

Now, in reproducing a recording video signal, the two channel video signals reproduced from the magnetic tape 24 in the same manner as that of the prior art of FIG. 1 are supplied to a reproducing system video signal processing circuit 33. The reproducing system video signal processing circuit 33 restores the Y signal of 48.6 MHz and the two color difference signals $P_B$ and $P_R$ of 16.2 MHz and outputs the same in response to the inputted TCI video signal. Data densities of the three channel signals should be equal to each other in order to subject the second component signal having the three channels to a digital inverse matrix processing as will be described later.

Then, the color difference signals $P_B$ and $P_R$ are applied to first and second interpolating filters 35 and 36 respectively, and interpolated such that each data density thereof becomes three times the original one. These interpolation filters 35 and 36 are formed of digital LPFs having the same structure as that of the above described decimation filters 14 and 15. A delay circuit 34 for delaying a Y signal output of the reproducing system video signal processing circuit 33 is provided having a delay time period equal to a processing time period of the first and the second interpolation filters 35 and 36. The delay circuit 34 compensates for a time difference between the three channel input signals of the inverse matrix circuit 37.

Then, respective outputs of the delay circuit 34 and the interpolation filters 35 and 36 are applied to the inverse matrix circuit 37. This inverse matrix circuit 37 basically has the same structure as that of the above described matrix circuit 11 (FIG. 4) and it differs from the above described matrix circuit 11 only in set coefficient values of the respective coefficient setting circuits $C_1$-$C_9$.

Namely, the coefficients $a_{11}$-$a_{33}$ of the coefficient setting circuits $C_1$-$C_9$ are set such that when the first component signal is selected, a relation of $$\begin{vmatrix} G \\ B \\ R \end{vmatrix} = \begin{vmatrix} 1 & -0.23 & -0.48 \\ 1 & 1.83 & 0 \\ 1 & 0 & 1.58 \end{vmatrix} \begin{vmatrix} Y \\ P_B \\ P_R \end{vmatrix}$$

and when the second component signal is selected, a relation of $$\begin{vmatrix} Y \\ P_B \\ P_R \end{vmatrix} = \begin{vmatrix} 1 & 0 & 0 \\ 0 & 1 & 0 \\ 0 & 0 & 1 \end{vmatrix} \begin{vmatrix} Y \\ P_B \\ P_R \end{vmatrix}$$

are obtained Such a switching of the coefficients is performed by a coefficient setting signal generated from an inverse matrix coefficient setting circuit 38 in response to an output format switching signal supplied from a terminal 84.

The inverse matrix circuit 37 outputs the first or the second component signal comprising three channels at a clock frequency of 48.6 MHz to apply the same to third, fourth and fifth D/A converting circuits 40a, 41a and 42a. These D/A converting circuits convert the applied respective channel signals into an analog signal in response to a clock having the same phase and frequency (48.6 MHz) and applies the converted signals to first, second and third blanking circuits 43a, 44a, and 45a. Each of the blanking circuits 43a, 44a and 45a adds a synchronizing signal to the component signal and particularly when the applied signal is a first component signal, it defines each blanking level of the signals R, G and B as a black level and when the applied signal is a second component signal, it defines a blanking level of the Y signal as a black level and blanking levels of the color difference signals $P_B$ and $P_R$ as achromatic color levels. Such a setting of a blanking level is controlled by a blanking level setting circuit 46 in response to the output format switching signal supplied through the terminal 84.

Respective signals outputted from the blanking circuits 43a, 44a and 45a are outputted through output terminals 81, 82 and 83 as first or second component signal through fourth, fifth and sixth LPFs 47a, 48a and 49a each having a cut-off frequency of 20 MHz. A recording timing signal generating circuit 17, a synchronization separating circuit 29, a reproducing timing signal generating circuit 32 and a synchronization signal generating circuit 39 are the same as those of the prior art shown in FIG. 1 and therefore no description thereof will be made here.

In the embodiment of FIG. 3, while the delay circuits 13 and 34 are provided in order to eliminate a time difference between the Y signal and the color difference signals constituting the second component signal, the above described time difference can be eliminated also by delaying a timing for a write into the recording system video signal processing circuit 16 or for a read from the reproducing video signal processing circuit 33 instead of the provision of such delay circuits.

While the above described first embodiment is an application of the present invention to a VTR as a recording and reproducing system for a color component signal, a scope of the application of the present invention is not limited to such a recording and reproducing system and may be applied to, for example, a transmitter and a receiver for a communication system.

Figure 5A:
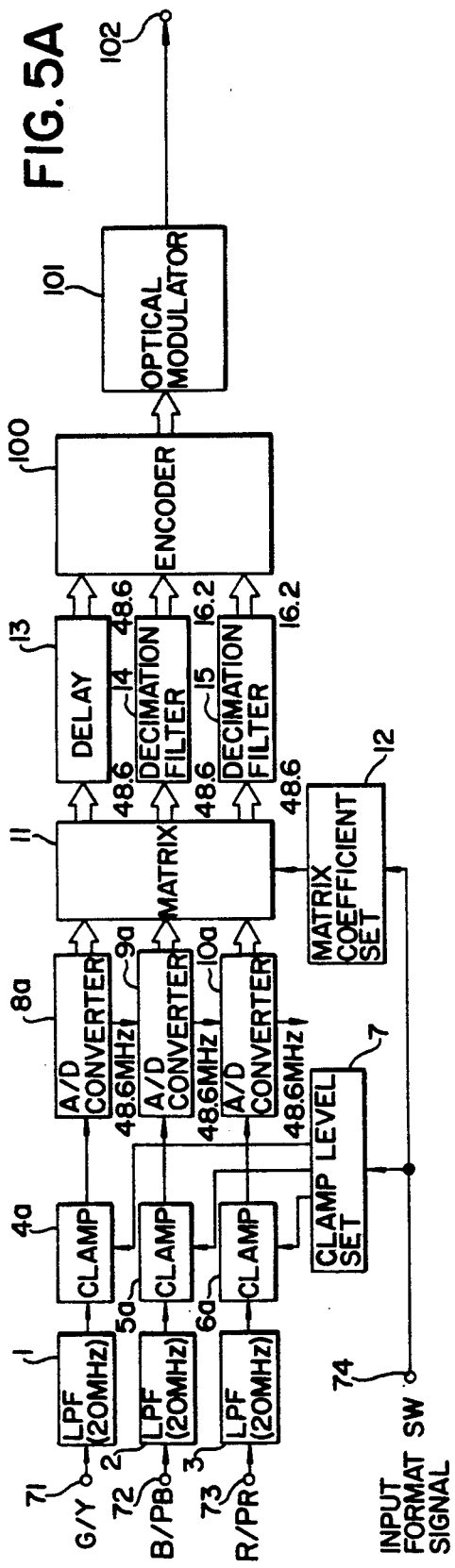
FIGS. 5A and 5B are block diagrams showing a transmitter and a receiver for optical communication respectively according to a second embodiment of the present invention.
Figure 5B:
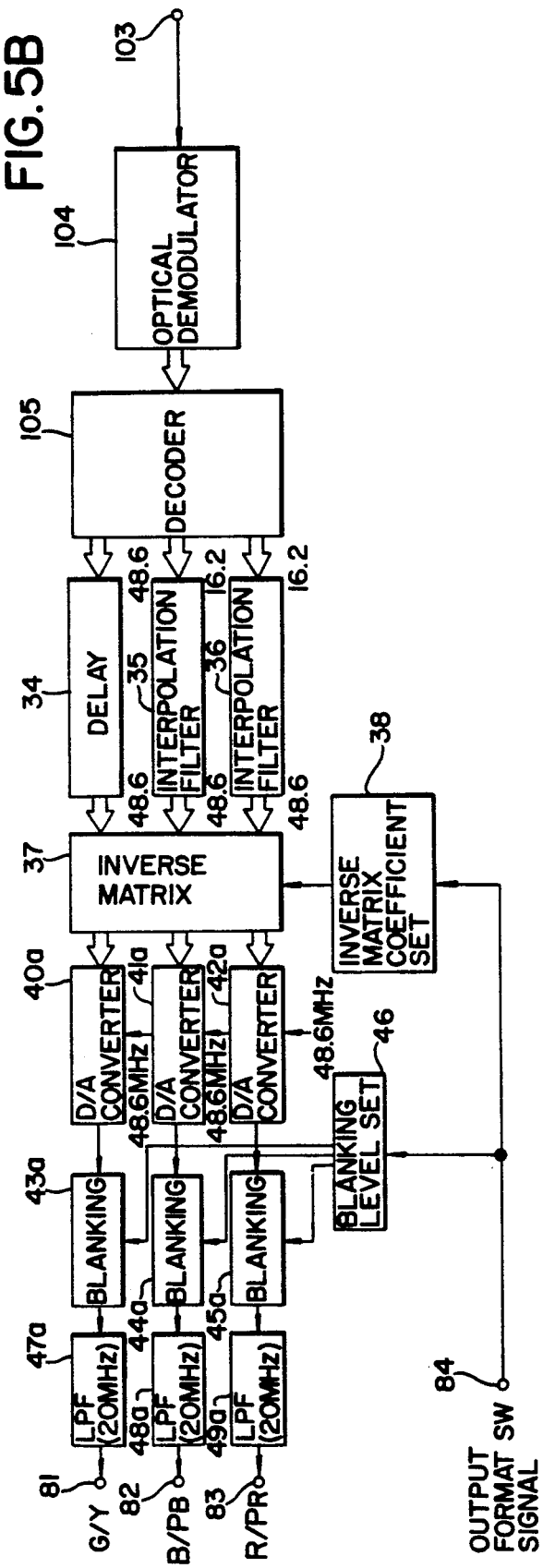

FIGS. 5A and 5B are block diagrams showing respectively a transmitter and a receiver for optical communication according to the second embodiment of the present invention.

In the transmitter shown in FIG. 5A, structures of input terminals 71, 72, 73 and 74, a delay circuit 13 and decimation filters 14 and 15 are the same as those of the corresponding portions of the first embodiment shown in FIG. 3 and therefore no description thereof will be made. A Y signal and two color difference signals $P_B$ and $P_R$ outputted respectively from the delay circuit 13 and the decimation filters 14 and 15 are applied in parallel to an encoder 100 and which encoder subjects these signals to a predetermined signal processing, for example, the above described TCI processing or the like. An output signal of the encoder 100 is converted into an optical signal by an optical modulator 101 and then supplied to an optical fiber cable (not shown) through an output terminal 102.

On the other hand, in the transmitter shown in FIG. 5B, the optical signal which arrives at an input terminal 103 through the optical fiber cable (not shown) is converted into an electric signal (for example a TCI video signal) by an optical demodulator 104 and applied to a decoder 105. The decoder 105 restores the second component signal from this signal and applies the Y signal, the color difference signals $P_B$ and $P_R$ to a delay circuit 34 and interpolation filters 35 and 36, respectively. The structures from the delay circuit 34 and the interpolation filters 35 and 36 to output terminals 81, 82 and 83 are the same as those of the corresponding portions of the first embodiment shown in FIG. 3 and therefore no description thereof will be made.

In addition, in the above described embodiments, in order to unify A/D conversion clocks of the A/D converting circuits 8a, 9a and 10a and D/A conversion clocks of the D/A converting circuits 40a, 41a and 42a, only the two color difference signals $P_B$ and $P_R$ are over-sampled at a sampling rate (i.e. 48.6 MHz) defined for the Y signal not at their sampling rates defined by a format for a VTR or a transmission path (i.e 16.2 MHz).

However, if structured such that the Y signal is also over-sampled, more simple structured, that is, a low cost analog LPF can be used, although in such a case, the over-sampled Y signal also should be decimated/interpolated by a digital filter.

Furthermore, while the above described embodiments, described is a case where a color component signal comprising a Y signal and two color difference signals $P_B$ and $P_R$ is used as a second component signal, the present invention can be applied to a second component signal comprising a Y signal and other types of color signals.

As an example of such a component signal, there is a component signal for HDTV comprising a Y signal and signals of $C_W$ and $C_N$, signal bands of which being defined as 20 MHz, 7 MHz and 5 MHz respectively and sampling rates thereof as 48.6 MHz, 16.2 MHz and 12.15 MHz respectively. In such a case, coefficients of respective coefficient setting circuits of the matrix circuit 11 with respect to the second component signal is set as follows.

$$\begin{vmatrix} Y \\ C_W \\ C_N \end{vmatrix} = \begin{vmatrix} 0.59 & 0.11 & 0.30 \\ -0.47 & -0.16 & 0.63 \\ -0.38 & 0.41 & -0.03 \end{vmatrix} \begin{vmatrix} G \\ B \\ R \end{vmatrix}$$

In addition, in this case each of the decimation filters and the interpolation filters of FIG. 1 should be changed as follows.

[First decimation filter 14]
Digital LPF of 7 MHz . . . decimate 48.6 MHz to 16.2 MHz (⅓).
[second decimation filter 15]
Digital LPF of 5 MHz . . . decimate 48.6 MHz to 12.15 MHz (¼).
[First interpolation filter 35]
Digital LPF of 7 MHz . . . interpolate 16.2 MHz to 48.6 MHz (three times)
[Second interpolation filter 36]
Digital LPF of 5 MHz . . . interpolate 12.15 MHz to 48.6 MHz (four times).

Furthermore, as another example of a second component signal, there is a component signal of the NTSC system comprising signals Y, I and Q, signal bands of which being defined as 13.5 MHZ, 6.75 MHz, and 3.375 MHz respectively. In this case, cut-off frequencies of the fist through the sixth LPFs are set at 6 MHz, sampling frequencies of the first through the third A/D converting circuits and the third through the fifth D/A converting circuits at 13.5 MHz and in addition, sampling rates of the respective outputs of the first delay circuit 13 and the first and the second decimation filters 14 and 15 at 13.5 MHz, 6.75 MHz and 3.375 MHz respectively.

As the foregoing, according to the embodiments of the present invention, a time difference between signals of respective channels is eliminated by passing an inputted/outputted component signal through a group of LPFs having common delay characteristics, and in addition, it will be unnecessary to compensate for a delay according to a type of the component signal by always passing the component signal through a matrix-/inverse matrix circuit having a fixed delay amount, irrespective of the type of the component signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color component signal converting apparatus for receiving a first analog color component signal comprising three color primary signals or a second analog color component signal comprising a luminance signal and two types of color signals to convert the same into a second digital color component signal, comprising:
    means (71, 72, 73) for selectively supplying said first or second analog color component signal,
    a group of low pass filter means (1, 2, 3) having common pass characteristics and for receiving respective signals constituting said supplied first or second analog color component signal,
    a group of A/D converting means (8a, 9a, 10a) for A/D converting respective outputs of said group of low pass filter means, with each of said group of A/D converting means converting said respective outputs at the same phase and frequency,
    matrix means (11, 12) having matrix coefficients switchable according to a type of the selected color component signal and for receiving outputs of said group of A/D converting means to convert the same into digital luminance signal data and two types of digital color signal data constituting said second digital color component signal, and
    first and second digital filter means (14, 15) each for decimating data density of said color signal data by limiting at least high frequency components of said color signal data.

2. A color component signal converting apparatus according to claim 1, further comprising means for delaying said luminance signal data outputted from said matrix means by a time period equal to a processing time period of said first and second digital filter means.

3. A color component signal converting apparatus according to claim 2, wherein said delaying means comprises a delay circuit (13) having a delay time equal to a processing time period of said first and second digital filter means.

4. A color component signal converting apparatus according to claim 2, further comprising signal processing means (16) for processing said second digital color component signal,
   wherein said delaying means comprises means for delaying a timing for writing said luminance signal data into said signal processing means by a time period equal to a processing time period of said first and second digital filter means.

5. A color component signal converting apparatus according to claim 1, further comprising a group of clamping means (4a, 5a, 6a) having clamp levels switchable according to a type of the selected color component signal and interposed between said group of low pass filter means and said group of A/D converting means.

6. A color component signal converting apparatus for receiving a second digital color component signal comprising digital luminance signal data and two types of digital color signal data to selectively convert the same into a first analog color component signal comprising three primary color signals or a second analog color component signal comprising a luminance signal and two types of color signals, comprising:
   first and second digital filter means (35, 36) each for interpolating data density of said color signal data by limiting at least high frequency components of said color signal data,
   inverse matrix means (37, 38) having matrix coefficients switchable according to a type of the selected color component signal and for receiving said luminance signal data and outputs of said first and second digital filter means to convert the same into a first digital color component signal or a second digital color component signal,
   a group of D/A converting means (40a, 41a, 42a) for D/A converting respective output of said inverse matrix means at the same phase and frequency, and
   a group of low pass filter means (47a, 48a, 49a) having common pass characteristics and for receiving outputs of said group of D/A converting means.

7. A color component signal converting apparatus according to claim 6, further comprising means for delaying said luminance signal data inputted to said inverse matrix means by a time period equal to a processing time period of said first and second digital filter means.

8. A color component signal converting apparatus according to claim 7, wherein said delaying means comprises a delay circuit (24) having a delay time period equal to a processing time period of said first and second digital filter means.

9. A color component signal converting apparatus according to claim 7, further comprising,
   signal processing means (33) for supplying said second digital color component signal,
   wherein said delaying means comprises means for delaying a timing for reading said luminance signal data from said signal processing means by a time period equal to a processing time period of said first and second digital filter means.

10. A color component signal converting apparatus according to claim 6, further comprising a group of blanking means (43a, 44a, 45a) having blanking levels switchable according to a type of the selected color component signal and interposed between said group of D/A converting means and said group of low pass filtering means.

* * * * *